United States Patent
Son et al.

(10) Patent No.: US 10,270,526 B2
(45) Date of Patent: Apr. 23, 2019

(54) APPARATUS AND METHOD FOR MONITORING STATUS OF TERMINAL

(71) Applicant: Electronics and Telecommunications Research Institute, Daejeon (KR)

(72) Inventors: Byung-Hee Son, Yongin-si (KR); Geun Yong Kim, Gwangju (KR); Jae In Kim, Gwangju (KR); Hee Do Kim, Seoul (KR); Moon Kyun Oh, Daejeon (KR); Hark Yoo, Gwangju (KR); Dongsoo Lee, Yongin-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/805,236

(22) Filed: Nov. 7, 2017

(65) Prior Publication Data
US 2018/0131436 A1    May 10, 2018

(30) Foreign Application Priority Data

Nov. 7, 2016  (KR) .................. 10-2016-0147311
Jan. 23, 2017  (KR) .................. 10-2017-0010181
Jul. 10, 2017  (KR) .................. 10-2017-0087325

(51) Int. Cl.
*H04B 10/071*  (2013.01)
*H04B 10/079*  (2013.01)
(Continued)

(52) U.S. Cl.
CPC ....... *H04B 10/071* (2013.01); *H04B 10/0779* (2013.01); *H04B 10/0791* (2013.01);
(Continued)

(58) Field of Classification Search
CPC ............ H04B 10/071; H04B 10/07955; H04B 10/27; H04B 10/0793; H04B 10/0791
(Continued)

(56) References Cited

U.S. PATENT DOCUMENTS 5,680,234 A * 10/1997 Darcie ................. H04B 10/071
                                                                                                        398/25
5,907,417 A * 5/1999 Darcie ................. H04B 10/035
                                                                                                        398/20
(Continued)

FOREIGN PATENT DOCUMENTS

KR          101145500 B1       5/2012
KR          101251302 B1       4/2013
KR      1020140011019 A        1/2014

OTHER PUBLICATIONS

Sun-Chien Ko, Shu-Chuan Lin, and Yin-Hsun Huang, A fiber fault monitoring design for PON system using reflective signal, The 16th Opto-Electronics and Communications Conference, OECC 2011, Jul. 4-8, 2011, IEEE, Kaohsiung, Taiwan.

*Primary Examiner* — Juan A Torres
(74) *Attorney, Agent, or Firm* — William Park & Associates Ltd.

(57) ABSTRACT

A terminal status monitoring apparatus connected to a terminal at an optical subscriber side in an optical network is provided. A signal transferring unit transfers a downlink optical signal to the terminal and receives, as a reflected optical signal, the downlink optical signal which is reflected at the terminal. A signal receiving unit measures an intensity of the reflected optical signal. A signal processing unit determines a connection status of a terminal device at the terminal by comparing an intensity of the downlink optical signal with the intensity of the reflected optical signal. A signal output unit outputs the connection status.

14 Claims, 8 Drawing Sheets

(51) Int. Cl.
  *H04B 10/27* (2013.01)
  *H04B 10/077* (2013.01)

(52) U.S. Cl.
  CPC ... *H04B 10/0793* (2013.01); *H04B 10/07955* (2013.01); *H04B 10/27* (2013.01)

(58) Field of Classification Search
  USPC .......................................................... 398/25
  See application file for complete search history.

(56) References Cited

U.S. PATENT DOCUMENTS

| | | | | |
|---|---|---|---|---|
| 7,035,544 | B1* | 4/2006 | Won ........................ | H04J 14/02 398/11 |
| 8,774,623 | B2 | 7/2014 | Yang et al. | |
| 8,971,710 | B2 | 3/2015 | Jeong et al. | |
| 2004/0151494 | A1* | 8/2004 | King ...................... | H04B 10/07 398/16 |
| 2006/0007426 | A1* | 1/2006 | Weller ................. | H04B 10/071 356/73.1 |
| 2007/0036543 | A1* | 2/2007 | Weaver .............. | H04B 10/0775 398/16 |
| 2008/0052583 | A1* | 2/2008 | Matteson ........... | H04B 10/0773 714/734 |
| 2008/0309925 | A1* | 12/2008 | Abbott ................. | H04B 10/071 356/73.1 |
| 2011/0116799 | A1* | 5/2011 | Effenberger ....... | G01M 11/3127 398/79 |
| 2011/0135309 | A1 | 6/2011 | Lee et al. | |
| 2011/0206367 | A1* | 8/2011 | Gilbert ................. | H04B 10/272 398/16 |
| 2013/0051791 | A1* | 2/2013 | Zhao ................... | H04B 10/0773 398/17 |
| 2014/0072296 | A1* | 3/2014 | Montalvo Garcia ........................ | G01M 11/3127 398/16 |
| 2016/0191154 | A1* | 6/2016 | Lin ................... | H04B 10/07957 398/16 |
| 2017/0085318 | A1* | 3/2017 | Ruchet ............ | H04B 10/07955 |

* cited by examiner

APPARATUS AND METHOD FOR MONITORING STATUS OF TERMINAL

CROSS-REFERENCE TO RELATED APPLICATION

This application claims priority to and the benefit of Korean Patent Applications Nos. 10-2016-0147311, 10-2017-0010181, and 10-2017-0087325 filed in the Korean Intellectual Property Office on Nov. 7, 2016, Jan. 23, 2017, and Jul. 10, 2017, the entire contents of which are incorporated herein by reference.

BACKGROUND

(a) Field

The present invention generally relates to an apparatus and method for monitoring a status of a terminal. More particularly, the present invention generally relates to an apparatus and method for monitoring a status of a terminal in an optical network.

(b) Description of the Related Art

Recently, due to explosive increase in mobile data traffic, attempts for providing broadband, long-range, and high-dense wired or wireless networks have been made. In a wired optical network, gigabit Ethernet passive optical network (E-PON) and gigabit passive optical network (G-PON) technologies are becoming popular.

An optical communication service provider dispatches a worker to an optical subscriber side when a new subscriber of an optical communication service is opened or a fault report occurs. An optical subscriber distribution box is connected to an optical line from an optical line terminal (OLT) and a plurality of optical lines to be distributed to each home. When establishing an optical line for the new subscriber, it should be determined whether a port at a terminal is in use. However, since it is difficult to understand the optical line connection information of the optical network at a branching point, it is difficult for the worker to carry out the work. At the actual site, there may be an optical line that is not used because a subscriber has changed a service provider or moved out but is connected to an optical subscriber distribution box.

Currently, an optical power meter or an optical time domain reflectometer (OTDR) is used as a measurement instrument for checking a status of the terminal. The optical power meter numerically measures the loss of the whole optical path. The optical power meter can determine an intensity of an optical signal received at a measuring point but cannot determine a current status of a port. The OTDR is a measuring instrument that introduces an optical pulse to an optical line to detect backward scattering caused by Rayleigh scattering within the optical line and a reflection light generated at a connection point and a determination point, thereby detecting a failure point and calculating a transmission loss. Although the OTDR can accurately determine the status of the optical, it is inefficient to provide all of the workers who can work sufficiently with simple status information with the OTDRs which are expensive measuring instruments.

SUMMARY

An embodiment of the present invention provides an apparatus and method for easily monitoring a status of a terminal.

According to an embodiment of the present invention, a terminal status monitoring apparatus connected to a terminal at an optical subscriber side in an optical network is provided. The terminal status monitoring apparatus includes a signal transferring unit, a signal receiving unit, a signal processing unit, and a signal output unit. The signal transferring unit transfers a downlink optical signal to the terminal and receives, as a reflected optical signal, the downlink optical signal which is reflected at the terminal. The signal receiving unit measures an intensity of the reflected optical signal. The signal processing unit determines a connection status of a terminal device at the terminal by comparing an intensity of the downlink optical signal with the intensity of the reflected optical signal. The signal output unit outputs the connection status.

The signal processing unit may consider a type of an optical connector used for a connection of the terminal device when determining the connection status.

The signal receiving unit may determines the connection status to a first status where the terminal device is connected to the terminal when a loss in the reflected optical signal is included in a first range, and may determine the connection status to a second status where the terminal device is not connected to the terminal when the loss in the reflected optical signal is included in a second range different from the first range.

The signal receiving unit may determine the connection status to a third status where the terminal device is connected to the terminal and is powered on when the intensity of the reflected optical signal is greater than or equal to a predetermined magnitude. In this case, the first status may be a status where the terminal device is connected to the terminal and is powered off.

A magnitude included in the first range may be less than a magnitude included in the second range when an optical connector used for a connection of the terminal device is a PC (physical contact) type.

A magnitude included in the first range may be greater than a magnitude included in the second range when an optical connector used for a connection of the terminal device is an APC (angled physical contact) type.

The downlink optical signal may be a downlink optical signal which is transmitted from an optical line from an optical line terminal (OLT) in the optical network.

The signal receiving unit may include a first photoelectric conversion element for measuring the intensity of the downlink optical signal and a second photoelectric conversion element for measuring the intensity of the reflected optical signal.

The signal transferring unit may include a coupler that distributes the downlink optical signal into the terminal and the signal receiving unit and transfers the reflected optical signal from the terminal to the signal receiving unit.

The terminal status monitoring apparatus may further include a light source that generates the downlink optical signal.

The signal receiving unit may include a photoelectric conversion element for measuring the intensity of the reflected optical signal.

The signal transferring unit may include a splitter that transfers the downlink optical signal generated by the light source to the terminal and transfers the reflected optical signal from the terminal to the signal receiving unit.

The light source may include a laser diode.

The terminal status monitoring apparatus may further include at least one of an optical power meter unit that measures an intensity of a downlink optical signal from an OLT in the optical network and an intensity of an uplink optical signal from the terminal device or a visual fault locator unit that detects a fault locator at the terminal.

According to another embodiment of the present invention, a method of monitoring a terminal status by a terminal status monitoring apparatus connected to a terminal at an optical subscriber side in an optical network is provided. The method include, distributing a downlink optical signal from an OLT in the optical network into the terminal and an inside of the terminal status monitoring apparatus, measuring an intensity of the downlink optical signal distributed to the inside, receiving, as reflected optical signal, the downlink optical signal which is reflected at the terminal, measuring an intensity of the reflected optical signal, determining a connection status of a terminal device at the terminal by comparing the intensity of the downlink optical signal with the intensity of the reflected optical signal, and outputting the connection status.

When determining the connection status, a type of an optical connector used for a connection of the terminal device may be considered.

When determining the connection status, the connection status may be determined to a first status where the terminal device is connected to the terminal when a loss in the reflected optical signal is included in a first range determined by the type, and the connection status may be determined to a second status where the terminal device is not connected to the terminal when the loss in the reflected optical signal is included in a second range determined by the type, the second range being different from the first range.

According to yet another embodiment of the present invention, a method of monitoring a terminal status by a terminal status monitoring apparatus connected to a terminal at an optical subscriber side in an optical network is provided. The method includes generating an optical signal, transferring the optical signal to the terminal, receiving, as reflected optical signal, the optical signal which is reflected at the terminal, measuring an intensity of the reflected optical signal, determining a connection status of a terminal device at the terminal by comparing an intensity of the generated optical signal with the intensity of the reflected optical signal, and outputting the connection status.

When determining the connection status, a type of an optical connector used for a connection of the terminal device may be considered.

When determining the connection status, the connection status may be determined to a first status where the terminal device is connected to the terminal when a loss in the reflected optical signal is included in a first range determined by the type, and the connection status may be determined to a second status where the terminal device is not connected to the terminal when the loss in the reflected optical signal is included in a second range determined by the type, the second range being different from the first range.

According to an embodiment of the present invention, a status of a terminal device at a terminal in an optical network can be easily monitored.

DETAILED DESCRIPTION OF THE EMBODIMENTS

Figure 1:
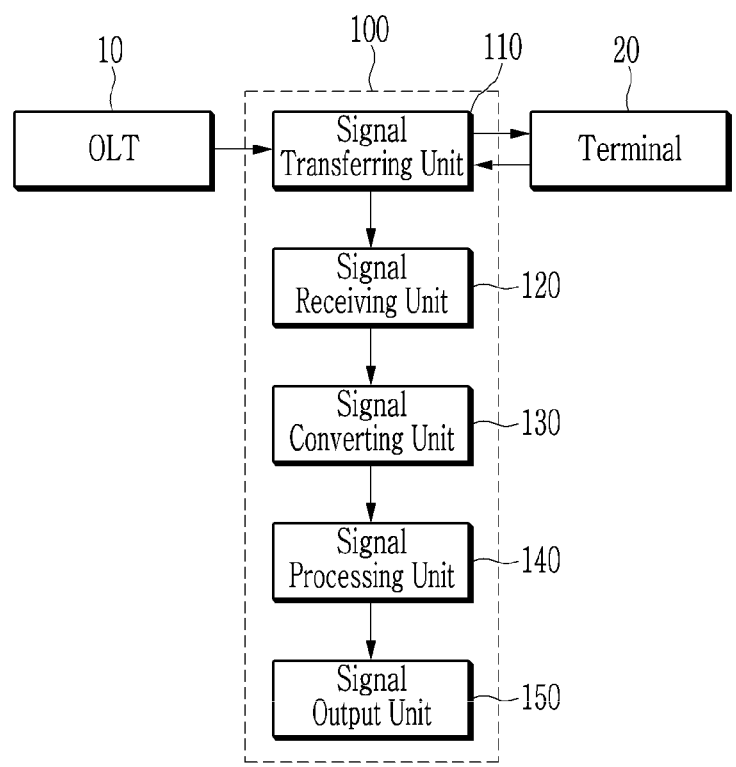
FIG. 1 is a schematic block diagram of a terminal status monitoring apparatus in an optical network according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A term described in the singular may be interpreted as singular or plural unless an explicit term such as "one" or "single" is used.

Figure 2:
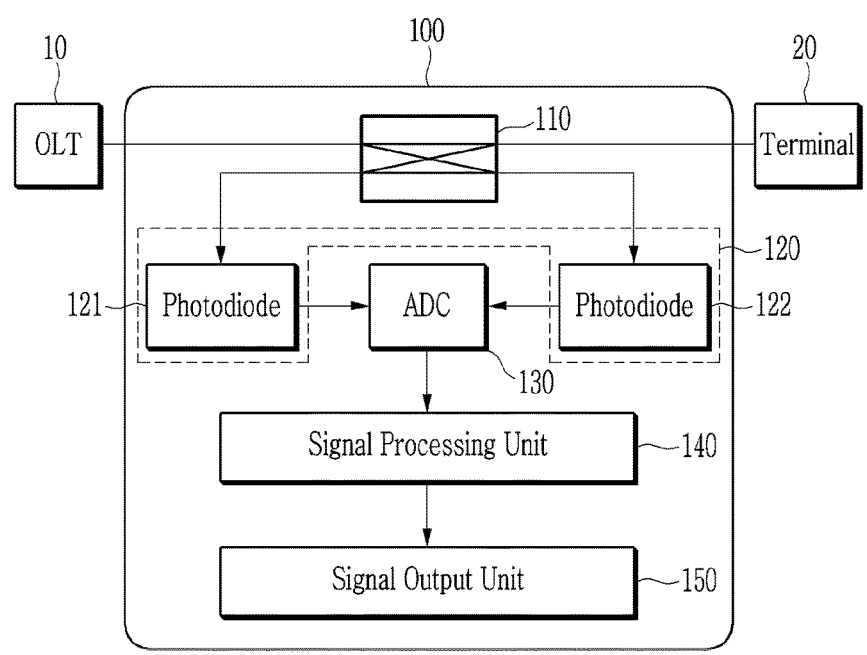
FIG. 2 shows an example of a terminal status monitoring apparatus shown in FIG. 1.

FIG. 1 is a schematic block diagram of a terminal status monitoring apparatus in an optical network according to an embodiment of the present invention, and FIG. 2 shows an example of a terminal status monitoring apparatus shown in FIG. 1.

In some embodiments, a terminal status monitoring apparatus 100 monitors a connection status of a terminal device, for example, an optical network terminal (ONT) connected to a terminal 20 at an optical subscriber side. For example, the terminal status monitoring apparatus 100 may be installed at a distribution box at the optical subscriber side. In one embodiment, the terminal status monitoring apparatus 100 may be carried and used by a worker.

Referring to FIG. 1, the terminal status monitoring apparatus 100 includes a signal transferring unit 110, a signal receiving unit 120, a signal converting unit 130, a signal processing unit 140, and a signal output unit 150.

The signal transferring unit 110 may be connected to the terminal 20 at the optical subscriber side and an optical line from an optical line terminal (OLT) 10. The signal transferring unit 110 may have an input end connected to the optical line from the OLT 10 and an input end connected to the terminal 20. The signal transferring unit 110 distributes a downlink optical signal into the terminal 20 and the signal receiving unit 120. The optical signal distributed to the terminal 20 is reflected at the terminal 20 to be inputted to the terminal status monitoring apparatus 100, and the signal transferring unit 110 transfers the optical signal reflected at the terminal 20 to the signal receiving unit 130. In some embodiments, as shown in FIG. 2, the signal transferring unit 110 may include a coupler, for example, a 2:2 coupler.

The signal receiving unit 120 receives the optical signal transferred from the signal transferring unit 110 and measures an intensity of the received optical signal. In some embodiments, the signal receiving unit 120 may include a plurality of photoelectric conversion elements, and each photoelectric conversion element may be a photodiode. In one embodiment, as shown in FIG. 2, the signal receiving unit 120 may include two photodiodes 121 and 122. In this case, the signal transferring unit 110 may distribute the optical signal inputted from the OLT 10 to the photodiode 122 and may transfer the optical signal reflected at the terminal 20 to the photodiode 121. The photodiode 121 may measure the intensity of the optical signal reflected at the terminal 20, and the photodiode 122 may measure the intensity of the optical signal inputted from the OLT 10.

The signal converting unit 130 converts the intensity of the optical signal measured by the signal receiving unit 120 into a digital signal. In some embodiments, as shown in FIG. 2, the signal converting unit 130 may include an analog to digital converter (ADC) for converting the intensity of the optical signal into the digital signal. In one embodiment, the signal converting unit 130 may convert the intensity of the optical signal measured by each of the photodiodes 121 and 122 into the digital signal. In another embodiment, if the intensity of the optical signal outputted from the signal receiving unit 120 is a digital signal, the signal converting unit 130 may be omitted.

The signal processing unit 140 monitors a connection status of the ONT at the terminal 20 based on the intensities of the optical signals which are converted into the digital signals. In some embodiments, the signal processing unit 140 may compare the intensity of the optical signal inputted from the OLT 10 with the intensity of the optical signal reflected at the terminal 20, and monitor whether the ONT is normally connected to terminal 20 based on the comparison result. The signal output unit 150 outputs the connection status that is monitored by the signal processing unit 140. In some embodiments, the signal processing unit 140 may be implemented by a processor such as a micro controller unit (MCU). In some embodiments, the signal output unit 150 may be implemented by a display device such as a liquid crystal display device (LCD), a light emitting diode (LED), or an organic light emitting diode (OLED).

Accordingly, the terminal status monitoring apparatus 100 can monitor the connection status of the terminal device in the terminal at the optical subscriber side by comparing the intensity of the downlink optical signal inputted from the OLT 10 with the intensity of the optical signal reflected at the terminal, without using a light source. Further, since the terminal status monitoring apparatus 100 transfers the downlink optical signal from the OLT 10 to the terminal 20, the ONT at the terminal 20 can seamlessly provide the Internet service while the connection status at the terminal is monitored.

Figure 3:
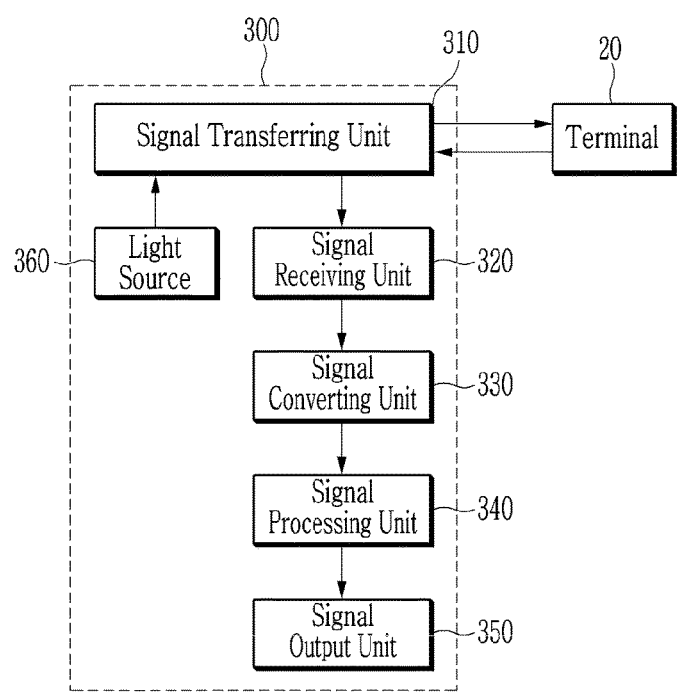
FIG. 3 is a schematic block diagram of a terminal status monitoring apparatus in an optical network according to another embodiment of the present invention.
Figure 4:
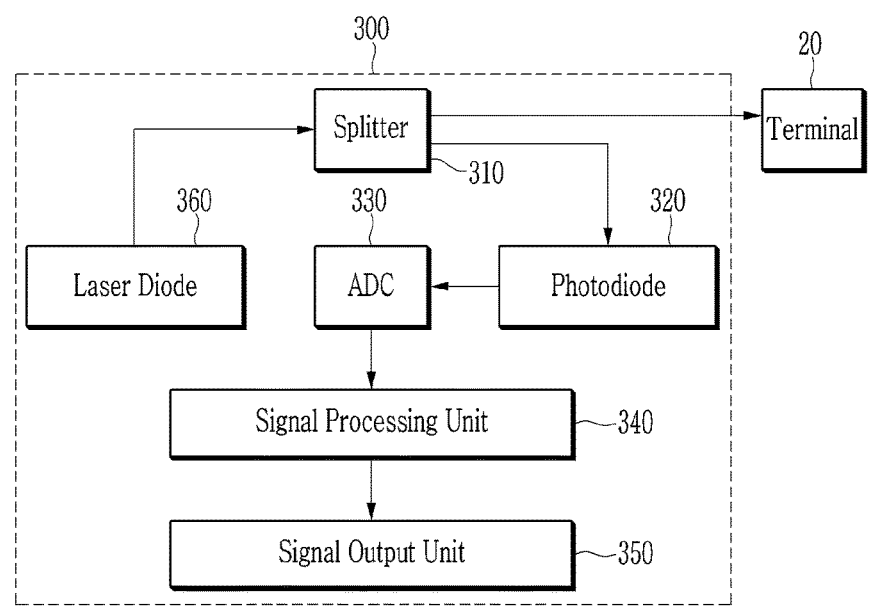
FIG. 4 shows an example of a terminal status monitoring apparatus shown in FIG. 3.

FIG. 3 is a schematic block diagram of a terminal status monitoring apparatus in an optical network according to another embodiment of the present invention, and FIG. 4 shows an example of a terminal status monitoring apparatus shown in FIG. 3.

Referring to FIG. 3, a terminal status monitoring apparatus 300 may use a light source. The terminal status monitoring apparatus 300 includes a signal transferring unit 310, a signal receiving unit 320, a signal converting unit 330, a signal processing unit 340, a signal output unit 350, and a light source 360.

The light source 360 generates an optical signal for monitoring a connection status of an ONT in a terminal 20 at an optical subscriber side and transfers the optical signal to the signal transferring unit 310. In some embodiments, as shown in FIG. 4, the light source 360 may include a laser diode.

The signal transferring unit 310 may be connected to the terminal 20 at the optical subscriber side. The signal transferring unit 310 may have an input end connected to the terminal 20. The signal transferring unit 310 transfers the optical signal generated by the light source 360 to the terminal 20. The optical signal transferred to the terminal 20 is reflected at the terminal 20 and inputted to the terminal status monitoring apparatus 300. The signal transferring unit 310 transfers the optical signal reflected at the terminal 20 to the signal receiving unit 330. In some embodiments, as shown in FIG. 4, the signal transferring unit 310 may include a splitter, for example, a 1:2 splitter.

The signal receiving unit 320 receives the optical signal transferred from the signal transferring unit 310 and measures an intensity of the received optical signal. In some embodiments, the signal receiving unit 320 may include a photoelectric conversion element, for example a photodiode, for the intensity of the optical signal reflected at the terminal 20.

The signal converting unit 330 converts the intensity of the optical signal measured by the signal receiving unit 320 into a digital signal. In some embodiments, as shown in FIG. 4, the signal converting unit 330 may include an ADC for converting the intensity of the optical signal into the digital signal. In one embodiment, the signal converting unit 330 may convert the intensity of the optical signal measured by the photodiode 320 into the digital signal. In another embodiment, if the intensity of the optical signal outputted from the signal receiving unit 320 is a digital signal, the signal converting unit 330 may be omitted.

The signal processing unit 340 monitors a connection status of the ONT at the terminal 20 based on the intensity of the optical signal which is converted into the digital signal. In some embodiments, the signal processing unit 340 may compare the known intensity of the optical signal generated by the light source 360 with the intensity of the optical signal reflected at the terminal 20, and monitor whether the ONT is normally connected to terminal 20 based on the comparison result. The signal output unit 350 outputs the connection status that is monitored by the signal processing unit 340.

Accordingly, the terminal status monitoring apparatus 300 can monitor the connection status of the terminal device in the terminal at the optical subscriber side by using the light source without connecting to the optical lint from the OLT 10. Further, since the terminal status monitoring apparatus 300 monitors the connection status using the optical signal generated by the light source, the ONT at the terminal 20 can seamlessly provide the Internet service while the connection status at the terminal is monitored.

Next, a terminal status monitoring method in a terminal status monitoring apparatus according to an embodiment of the present invention is described with reference to FIG. 5.

Figure 5:
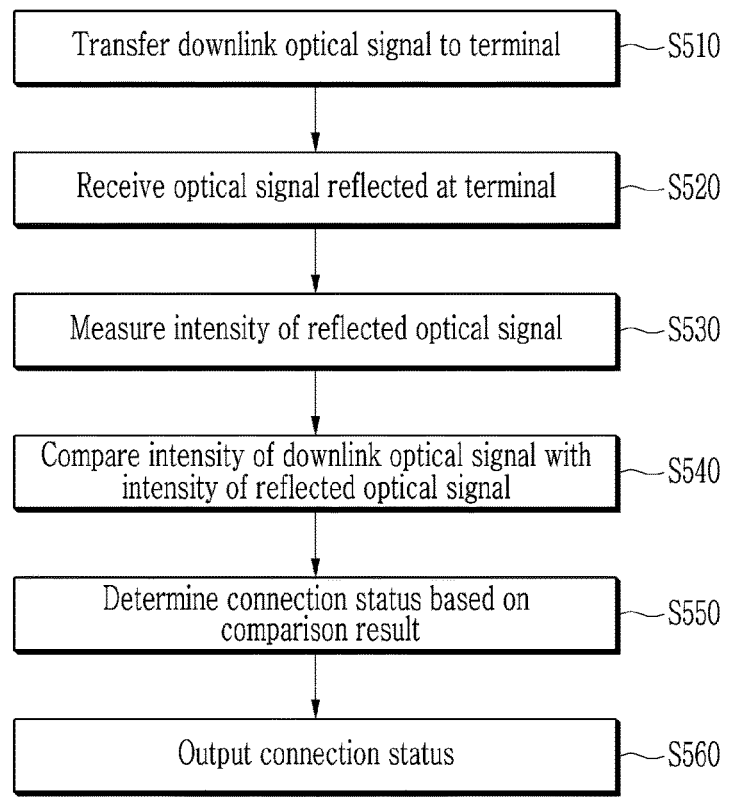
FIG. 5 is schematic flowchart of a terminal status monitoring method according to an embodiment of the present invention.

FIG. 5 is schematic flowchart of a terminal status monitoring method according to an embodiment of the present invention.

Referring to FIG. 5, a terminal status monitoring apparatus transfers a downlink optical signal to a terminal (S510). In one embodiment, the downlink optical signal may be a signal into which an optical signal inputted from an OLT is distributed. In another embodiment, the downlink optical signal may be an optical signal generated by a light source. The terminal status monitoring apparatus receives an optical signal reflected at the terminal (S520), and measures an intensity of the reflected optical signal (S530).

The terminal status monitoring apparatus compares the intensity of the reflected optical signal with an intensity of the downlink optical signal (S540). In one embodiment, the terminal status monitoring apparatus may measure an intensity of an optical signal distributed to the inside of the terminal status monitoring apparatus among optical signals into which the optical signal inputted from the OLT is distributed. In another embodiment, the terminal status monitoring apparatus may know the intensity of the optical signal generated by the light source in advance.

The terminal status monitoring apparatus determines a connection status of an ONT at the terminal based on the comparison result (S550), and outputs the determined connection status (S560). The intensity of the reflected optical signal may vary according to a type of an optical connector used in an optical line to be connected to the ONT at the terminal. In some embodiments, the terminal status monitoring apparatus may consider the type of the optical connector when determining the connection status.

In some embodiments, the optical connector type may be either a PC (physical contact) type or an APC (angled physical contact) type. In an optical connector of the PC type, a loss occurred when an optical signal is reflected in a case where the optical connector is connected to an ONT (i.e., a contact surface of an interface is a fiber) is less than a loss occurred when the optical signal is reflected in a case where the optical connector is not connected to the ONT (i.e., the contact surface of the interface is air). In an optical connector of the APC type, a loss occurred when an optical signal is reflected in a case where the optical connector is not connected to the ONT is less than a loss occurred when the optical signal is reflected in a case where the optical connector is connected to the ONT. Referring to Table 1, a magnitude [PC (fiber) or APC (fiber)] of the loss in the reflected optical signal may be, for example, −40 dB when the optical connector of the PC type or APC type is connected to the ONT. The magnitude [PC (air)] of the loss in the reflected optical signal may be, for example, −20 dB when the optical connector of the PC type is not connected to the ONT. The magnitude [APC (air)] of the loss in the reflected optical signal may be, for example, −60 dB when the optical connector of the APC type is not connected to the ONT.

TABLE 1

| Connector type (Interface state) | Loss [dB] |
| --- | --- |
| PC (fiber) | −40 |
| PC (air) | −20 |
| APC (fiber) | −40 |
| APC (air) | −60 |

Therefore, when the optical connector of the PC type is used, the terminal status monitoring apparatus may compare the intensity of the downlink optical signal with the intensity of the reflected optical signal, and may determine that the ONT is connected to the terminal when the loss of about −40 dB occurs in the reflected optical signal or determine that the ONT is not connected to the terminal when the loss of about −20 dB occurs in the reflected optical signal.

When the optical connector of the APC type is used, the terminal status monitoring apparatus may compare the intensity of the downlink optical signal with the intensity of the reflected optical signal, and may determine that the ONT is connected to the terminal when the loss of about −40 dB occurs in the reflected optical signal or determine that the ONT is not connected to the terminal when the loss of about −60 dB occurs in the reflected optical signal. In some embodiments, the type of the optical connector may be inputted to the terminal status monitoring apparatus by a user.

In some embodiments, since the intensity of the reflected optical signal may vary according to the state of the contact surface, the terminal status monitoring apparatus may use a predetermined range between an upper value greater than an ideal value (for example, a value shown in Table 1) and a lower value less than the ideal value when determining the loss. That is, the terminal status monitoring apparatus may determine the connection status of the ONT in accordance with a range in which the loss in the reflected optical signal is included.

In some embodiments, the terminal status monitoring apparatus may distinguish the connection status of the ONT into three statuses. That is, the terminal status monitoring apparatus may determine the connection status of the ONT as any one of a status where the ONT is connected to the terminal and is powered on, a status where the ONT is connected but is powered off, and a status where the ONT is not connected to the terminal. Since the optical signal from the ONT is inputted to the optical line when the ONT is connected to the terminal and is powered on, the intensity of the optical signal received in the terminal status monitoring apparatus is strong and is greater than a predetermined magnitude. For example, when the intensity of the optical signal is measured by the terminal status monitoring apparatus at an optical subscriber distribution box, the intensity of the optical signal may be greater than or equal to −10 dBm since the distance from the ONT to the optical subscriber distribution box is generally shorter than 200 m.

Accordingly, the terminal status monitoring apparatus may determine the connection status to the status where the ONT is connected to the terminal and is powered on when the intensity of the received optical signal is greater than or equal to the predetermined magnitude (for example, −10 dBm). Further, when the intensity of the received optical signal is less than the predetermined magnitude (for example, −10 dBm) and the loss in the reflected optical signal is included in a first range, the terminal status monitoring apparatus may determine the connection status to the status where the ONT is connected to the terminal but is powered off. When the intensity of the received optical signal is less than the predetermined magnitude (for example, −10 dBm) and the loss in the reflected optical signal is included in a second range, the terminal status monitoring apparatus may determine the connection status to the status where the ONT is not connected to the terminal. For example, the magnitude included in the first range may be less than the magnitude included in the second range in a case of the PC type, and the magnitude included in the first range may be greater than the magnitude included in the second range in a case of the APC type.

On the other hand, a terminal status monitoring apparatus according to an embodiment of the present invention may be combined with an optical power meter for measuring a power of an optical signal. These embodiments are described with reference to FIG. 6 to FIG. 8.

Figure 6:
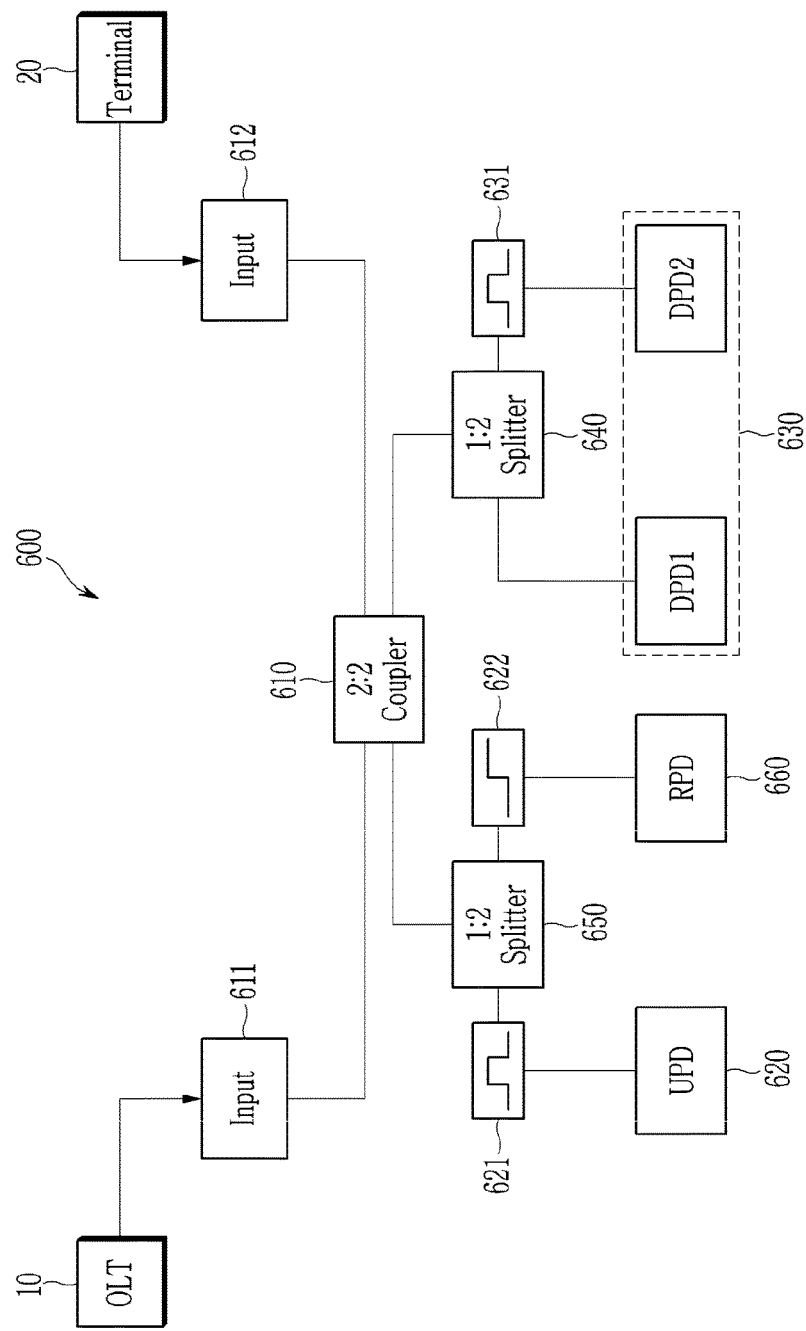
FIG. 6, FIG. 7 and FIG. 8 each are a schematic block diagram of a terminal status monitoring apparatus according to yet another embodiment of the present invention.
Figure 7:
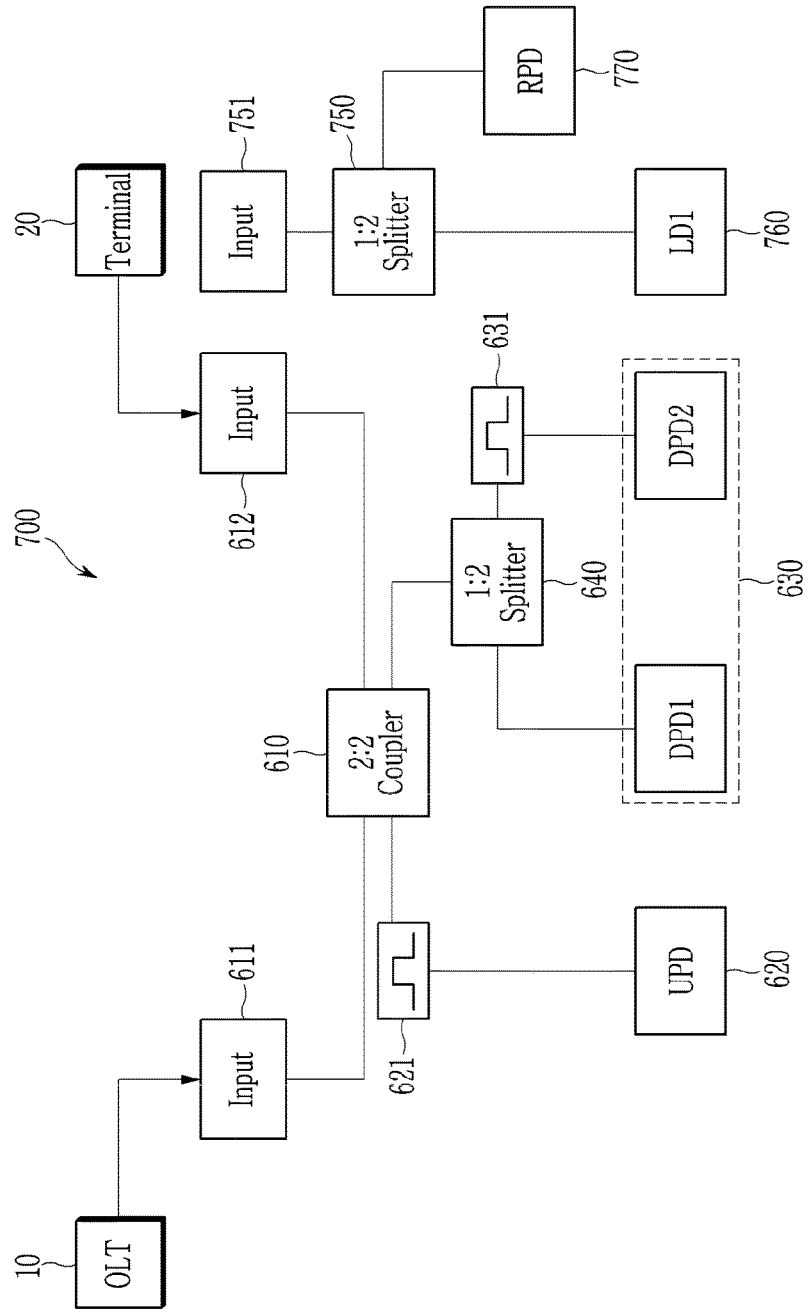
Figure 8:
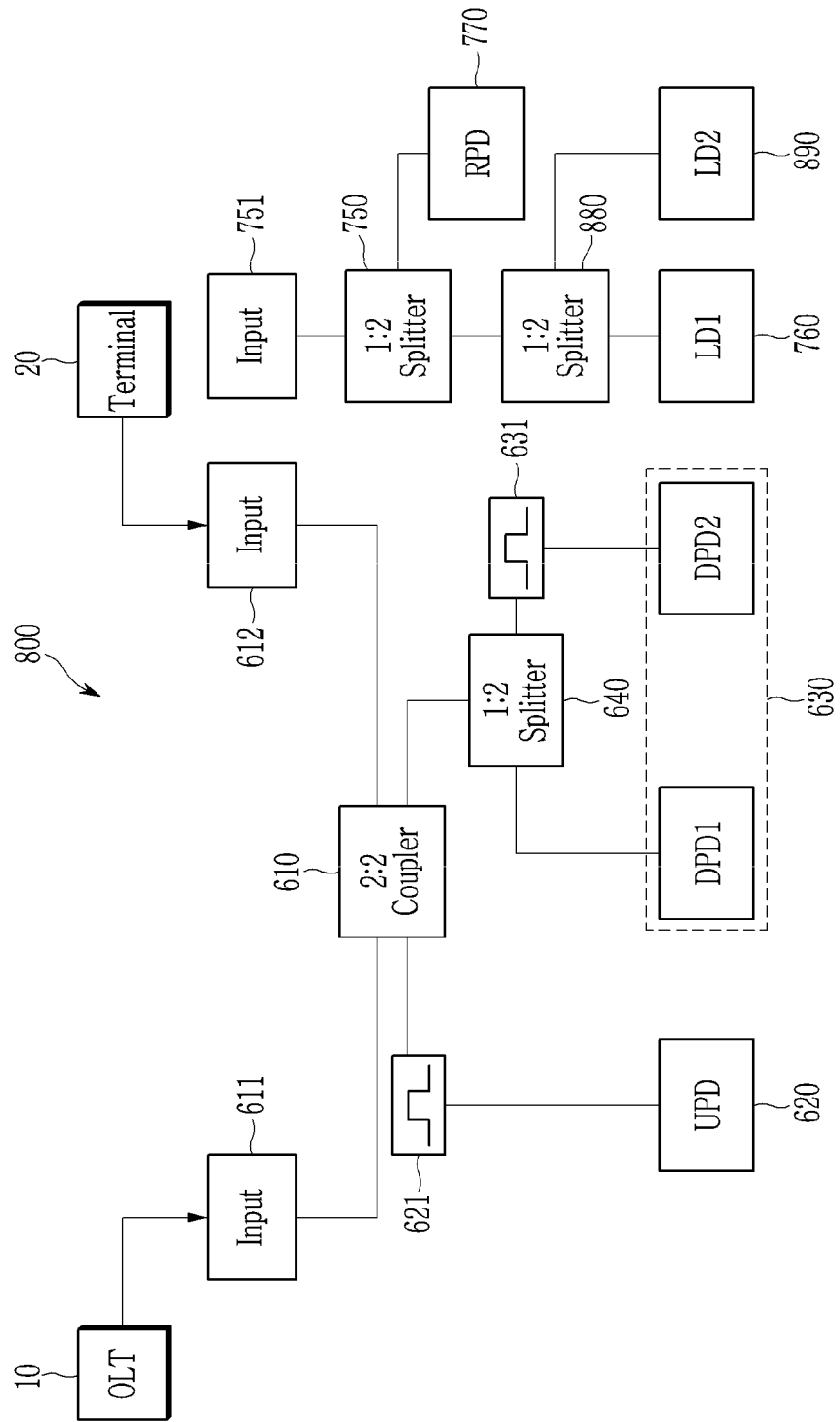

FIG. 6, FIG. 7 and FIG. 8 each are a schematic block diagram of a terminal status monitoring apparatus according to yet another embodiment of the present invention.

Referring to FIG. 6, a terminal status monitoring apparatus 600 includes a signal transferring unit 610, an uplink signal receiving unit 620, a downlink signal receiving unit 630, and a downlink signal distributing unit 640 in order to perform an optical power meter function.

The signal transferring unit 610 may be connected to an optical line from an OLT 10 and a terminal 20 at an optical subscriber side. The signal transferring unit 610 may have an input end 611 connected to the optical line from the OLT 10 and an input end 612 connected to the terminal 20. The signal transferring unit 610 distributes a downlink optical signal inputted from the OLT 10 into the terminal 20 and the downlink signal receiving unit 630, and distributes an uplink optical signal inputted from an ONT connected to the terminal 20 into the OLT 10 and the uplink signal receiving unit 620. In some embodiments, the signal transferring unit 610 may include a coupler, for example, a 2:2 coupler. The coupler 610 may use 9:1 ratio in order to minimize a loss in the downlink optical signal transmitted from the OLT 10 to the terminal 20 and a loss in the uplink optical signal transmitted from the terminal 20 to the OLT 10.

The uplink signal receiving unit 620 receives the uplink optical signal transferred from the signal transferring unit 610 and measures an intensity of the received uplink optical signal. In some embodiments, the uplink signal receiving unit 120 may include a photoelectric conversion element UPD for measuring the intensity of the received uplink optical signal, and the photoelectric conversion element may be a photodiode. In some embodiments, the terminal status monitoring apparatus 600 may further include a band pass filter 621 for filtering a wavelength band (for example, 1310 nm) used in the uplink optical signal. The uplink signal receiving unit 620 may measure the intensity of the uplink optical signal that is filtered by the band pass filter 621.

The downlink signal distributing unit 640 distributes the downlink optical signal transferred from the signal transferring unit 610 into a plurality of paths. In some embodiments, the downlink signal distributing unit 640 may include a 1:2 splitter for distributing the downlink optical signal into two paths.

The downlink signal receiving unit 630 receives each of the downlink optical signals which the downlink signal distributing unit 640 transfers into the plurality of paths and measures its intensity. In some embodiments, the downlink signal receiving unit 630 may include a plurality of photoelectric conversion elements DPD1 and DPD2 that correspond to the plurality of paths, respectively, and each photoelectric conversion element may be a photodiode. In some embodiments, the terminal status monitoring apparatus 600 may further include a band pass filter 631 for filtering a predetermined wavelength band (for example, 1490 nm) among wavelength bands used in the downlink optical signal. In this case, the photoelectric conversion element DPD2 may measure the intensity of the downlink optical signal (for example, the downlink optical signal with 1490 nm band) filtered by the band pass filter 631 among the downlink optical signals distributed by the downlink signal distributing unit 640. Another photoelectric conversion element DPD1 may measure the intensity of another downlink optical signal distributed by the downlink signal distributing unit 640.

Accordingly, the terminal status monitoring apparatus 600 can perform the optical power meter function by measuring the intensities (i.e., powers) of the uplink optical signal and the downlink optical signals.

The terminal status monitoring apparatus 600 may further an uplink signal distributing unit 650 and a reflected signal receiving unit 660 in order to perform a terminal status monitoring function.

The reflected signal receiving unit 660 may include a photoelectric conversion element RPD for measuring an intensity of the reflected signal. The uplink signal distributing unit 650 distributes the uplink optical signal transferred from the signal transferring unit 610 into a plurality of paths. In this case, an uplink optical signal distributed to one path among the plurality of paths is filtered by the band pass filter 621 and is transferred to the photoelectric conversion element UPD. The photoelectric conversion element UPD may measure the intensity of the uplink optical signal transmitted from the ONT connected to the terminal 20. In some embodiments, the terminal status monitoring apparatus 600 may further include a filter 622 for filtering a wavelength band of the reflected optical signal, i.e., a wavelength band of the downlink optical signal. The filter 622 may filter the optical signal distributed to another path among the plurality of paths. In one embodiment, since the downlink optical signal uses the longer wavelength band than the uplink optical signal, the filter 622 may a low pass filter. For example, the filter 622 may pass only the wavelength band greater than or equal to 1410 nm. Therefore, the photoelectric conversion element RPD may measure the intensity of the optical signal, i.e., the reflected optical signal, which is distributed to another path by the uplink signal distributing unit 650.

Accordingly, the terminal status monitoring apparatus 600 can determine the connection status of the terminal 20 by comparing the intensity of the downlink optical signal with the intensity of the reflected optical signal, thereby performing the connection status monitoring function.

In some embodiments, the terminal status monitoring apparatus 600 may further include a signal converting unit 130 or 330, a signal processing unit 140 or 340, and a signal output unit 150 or 350 described with reference to FIG. 1 or FIG. 3 in order to process and output the measured intensity of the optical signal.

In some embodiments, the terminal status monitoring apparatus 600 may further include a visual fault locator (VFL) unit. The VFL unit may include a laser diode (not shown) and detect a fault locator at the terminal.

Referring to FIG. 7, an optical power meter function and a terminal status monitoring function may be separated in a terminal status monitoring apparatus 700. As described with reference to FIG. 6, the terminal status monitoring apparatus 700 includes a signal transferring unit 610, an uplink signal receiving unit 620, a downlink signal receiving unit 630, and a downlink signal distributing unit 640 in order to perform the optical power meter function.

Referring to FIG. 7 again, the terminal status monitoring apparatus 700 further includes a signal distributing unit 750, a light source 760, and a reflected signal receiving unit 770 in order to perform the terminal status monitoring function.

The light source 760 generates an optical signal for monitoring a connection status of an ONT in a terminal 20 at an optical subscriber side and transfers the optical signal to the signal distributing unit 750. In some embodiments, the light source 760 may include a laser diode.

The signal distributing unit 750 transfers the optical signal generated by the light source 760 to the terminal 20 via an optical line. The signal distributing unit 750 may have an input end 751 connected to the terminal 20. The optical signal transferred to the terminal 20 is reflected at the terminal 20 and inputted to the terminal status monitoring apparatus 700. The signal distributing unit 750 transfers the optical signal reflected at the terminal 20 to the reflected signal receiving unit 770. In some embodiments, the signal distributing unit 750 may include a splitter, for example, a 1:2 splitter.

The signal receiving unit 770 receives the reflected optical signal transferred from the signal distributing unit 750 and measures the intensity of the reflected optical signal. In some embodiments, the signal receiving unit 770 may include a photoelectric conversion element RPD for measuring the intensity of the reflected optical signal, and the photoelectric conversion element RPD may be a photodiode.

In some embodiments, the terminal status monitoring apparatus 700 may further include a signal converting unit 130 or 330, a signal processing unit 140 or 340, and a signal output unit 150 or 350 described with reference to FIG. 1 or FIG. 3 in order to process and output the measured intensity of the optical signal.

In some embodiments, the terminal status monitoring apparatus 700 may further include a laser diode (not shown) to additionally perform a visual fault locator (VFL) function.

Referring to FIG. 8, an optical power meter function and a terminal status monitoring function may be separated and the terminal status monitoring function and a VFL function may be combined in a terminal status monitoring apparatus 800.

As described with reference to FIG. 6, the terminal status monitoring apparatus 800 includes a signal transferring unit 610, an uplink signal receiving unit 620, a downlink signal receiving unit 630, and a downlink signal distributing unit 640 in order to perform the optical power meter function. As described with reference to FIG. 7, the terminal status monitoring apparatus 800 further includes a signal distributing unit 750, a light source 760, and a reflected signal receiving unit 770 in order to perform the terminal status monitoring function.

Referring to FIG. 8 again, the terminal status monitoring apparatus 800 further includes a signal distributing unit 880 and a light source 890.

The light source 890 generates an optical signal for detecting a fault locator and transfers the generated optical signal to the signal distributing unit 880. In some embodiments, the light source 890 may include a laser diode LD2.

The signal distributing unit 880 transfers the optical signal delivered from the light source 890 to the signal distributing unit 750, and the signal distributing unit 750 transfer the received optical signal such that the optical signal is used for detecting the fault locator. The signal distributing unit 880 transfers an optical signal generated by the light source 750 to the signal distributing unit 750. In some embodiments, the signal distributing unit 880 may include a splitter, for example, a 1:2 splitter.

According to embodiments described with reference to FIG. 6 to FIG. 8, various functions can be implemented on a single device so that a worker in the field can perform the various functions by carrying only the single device without carrying multiple devices.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A terminal status monitoring apparatus connected to a terminal at an optical subscriber side in an optical network, comprising:
   a signal transferring unit that transfers a downlink optical signal to the terminal and receives, as a reflected optical signal, the downlink optical signal which is reflected at the terminal;
   a signal receiving unit that measures an intensity of the reflected optical signal;
   a signal processing unit that determines a connection status of a terminal device at the terminal by comparing an intensity of the downlink optical signal with the intensity of the reflected optical signal; and
   a signal output unit that outputs the connection status,
   wherein the signal processing unit considers a type of an optical connector used for a connection of the terminal device when determining the connection status, and
   wherein the signal receiving unit:
      determines the connection status to a first status where the terminal device is connected to the terminal when a loss in the reflected optical signal is included in a first range; and
      determines the connection status to a second status where the terminal device is not connected to the terminal when the loss in the reflected optical signal is included in a second range different from the first range.

2. The terminal status monitoring apparatus of claim 1, wherein the signal receiving unit determines the connection status to a third status where the terminal device is connected to the terminal and is powered on when the intensity of the reflected optical signal is greater than or equal to a predetermined magnitude, and wherein the first status is a status where the terminal device is connected to the terminal and is powered off.

3. The terminal status monitoring apparatus of claim 1, wherein a magnitude included in the first range is less than a magnitude included in the second range when an optical connector used for a connection of the terminal device is a PC (physical contact) type.

4. The terminal status monitoring apparatus of claim 1, wherein a magnitude included in the first range is greater than a magnitude included in the second range when an optical connector used for a connection of the terminal device is an APC (angled physical contact) type.

5. The terminal status monitoring apparatus of claim 1, wherein the downlink optical signal is a downlink optical signal which is transmitted from an optical line from an optical line terminal (OLT) in the optical network.

6. The terminal status monitoring apparatus of claim 1, further comprising a light source that generates the downlink optical signal.

7. The terminal status monitoring apparatus of claim 1, further comprising at least one of an optical power meter unit that measures an intensity of a downlink optical signal from an OLT in the optical network and an intensity of an uplink optical signal from the terminal device or a visual fault locator unit that detects a fault locator at the terminal.

8. The terminal status monitoring apparatus of claim 5, wherein the signal receiving unit includes a first photoelectric conversion element for measuring the intensity of the downlink optical signal and a second photoelectric conversion element for measuring the intensity of the reflected optical signal.

9. The terminal status monitoring apparatus of claim 5, wherein the signal transferring unit includes a coupler that distributes the downlink optical signal into the terminal and the signal receiving unit and transfers the reflected optical signal from the terminal to the signal receiving unit.

10. The terminal status monitoring apparatus of claim 6, wherein the signal receiving unit includes a photoelectric conversion element for measuring the intensity of the reflected optical signal.

11. The terminal status monitoring apparatus of claim 6, wherein the signal transferring unit includes a splitter that transfers the downlink optical signal generated by the light source to the terminal and transfers the reflected optical signal from the terminal to the signal receiving unit.

12. The terminal status monitoring apparatus of claim 6, wherein the light source includes a laser diode.

13. A method of monitoring a terminal status by a terminal status monitoring apparatus connected to a terminal at an optical subscriber side in an optical network, the method comprising:
- distributing a downlink optical signal from an optical line terminal (OLT) in the optical network into the terminal and an inside of the terminal status monitoring apparatus;
- measuring an intensity of the downlink optical signal distributed to the inside;
- receiving, as reflected optical signal, the downlink optical signal which is reflected at the terminal;
- measuring an intensity of the reflected optical signal;
- determining a connection status of a terminal device at the terminal by comparing the intensity of the downlink optical signal with the intensity of the reflected optical signal; and
- outputting the connection status,
- wherein determining the connection status includes considering a type of an optical connector used for a connection of the terminal device when determining the connection status, and
- wherein determining the connection status includes:
  - determining the connection status to a first status where the terminal device is connected to the terminal when a loss in the reflected optical signal is included in a first range determined by the type; and
  - determining the connection status to a second status where the terminal device is not connected to the terminal when the loss in the reflected optical signal is included in a second range determined by the type, the second range being different from the first range.

14. A method of monitoring a terminal status by a terminal status monitoring apparatus connected to a terminal at an optical subscriber side in an optical network, the method comprising:
- generating an optical signal;
- transferring the optical signal to the terminal;
- receiving, as reflected optical signal, the optical signal which is reflected at the terminal;
- measuring an intensity of the reflected optical signal;
- determining a connection status of a terminal device at the terminal by comparing an intensity of the generated optical signal with the intensity of the reflected optical signal; and
- outputting the connection status,
- wherein determining the connection status includes considering a type of an optical connector used for a connection of the terminal device when determining the connection status, and
- wherein determining the connection status includes:
  - determining the connection status to a first status where the terminal device is connected to the terminal when a loss in the reflected optical signal is included in a first range determined by the type; and
  - determining the connection status to a second status where the terminal device is not connected to the terminal when the loss in the reflected optical signal is included in a second range determined by the type, the second range being different from the first range.

* * * * *